Jan. 18, 1938.　　　　F. D. ROHMER　　　　2,105,756
RELAY FOR AUTOMOBILE LIGHTING CIRCUITS
Filed Aug. 12, 1935
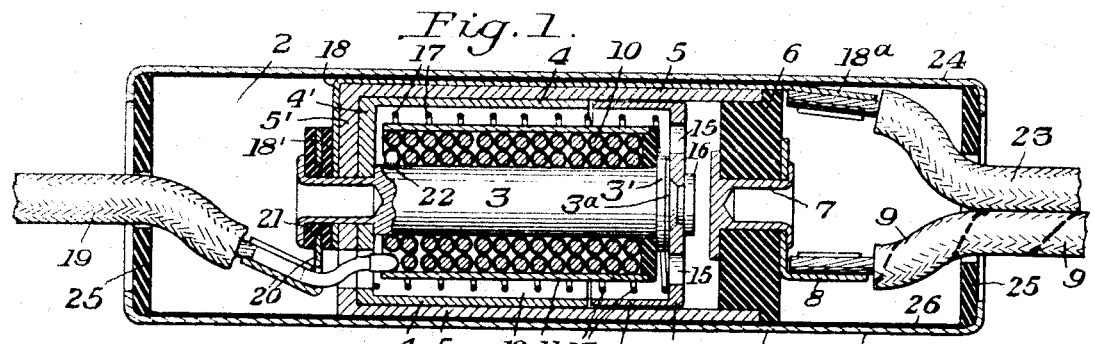
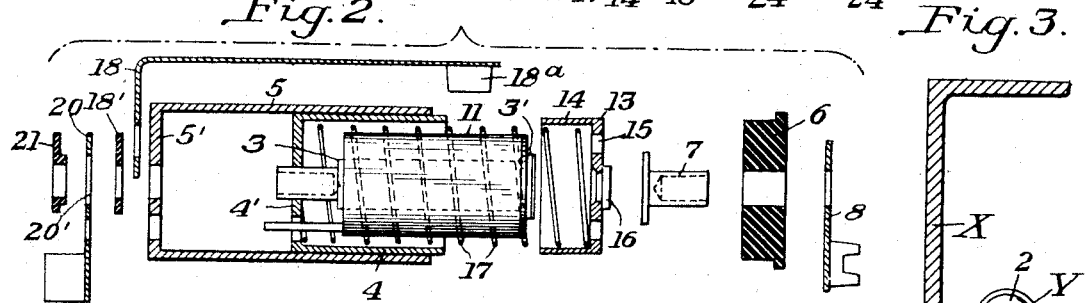
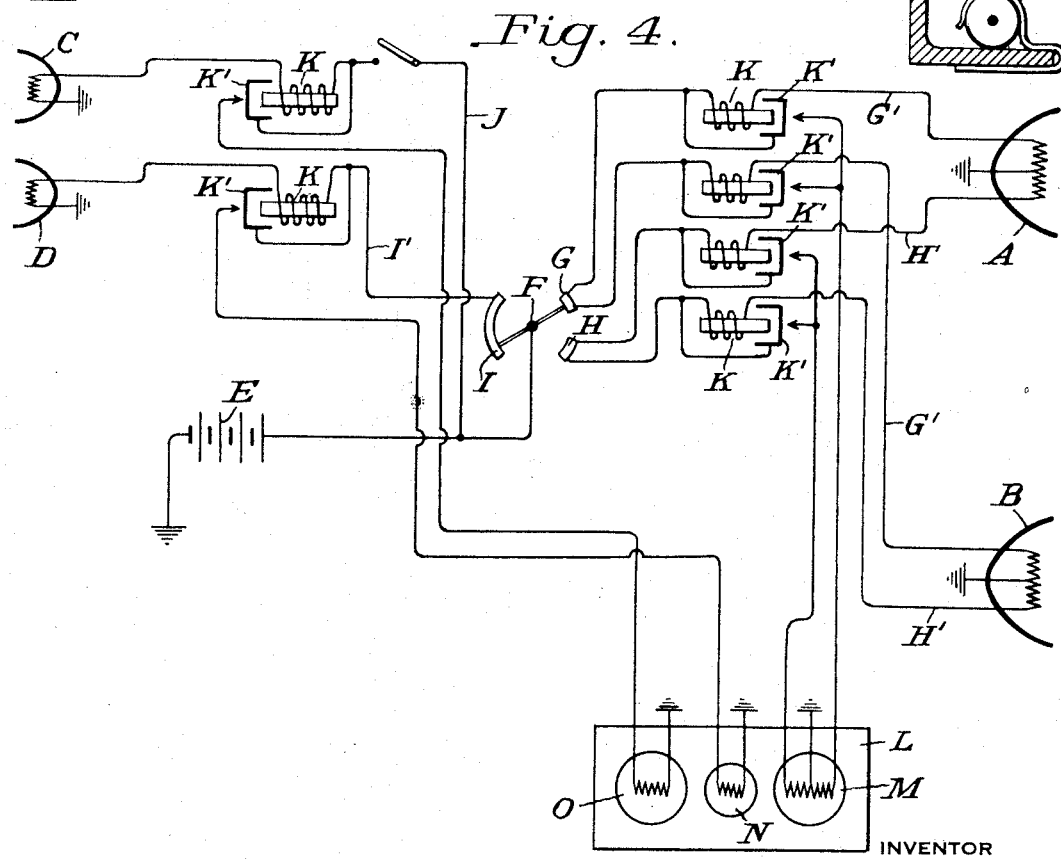
INVENTOR
Frank D. Rohmer
by
Byrnes, Stebbins & Blenko
his Attys.

Patented Jan. 18, 1938

2,105,756

UNITED STATES PATENT OFFICE 2,105,756

RELAY FOR AUTOMOBILE LIGHTING CIRCUITS

Frank D. Rohmer, Midland, Pa., assignor to Bocjl Corporation, Pittsburgh, Pa., a corporation of Delaware Application August 12, 1935, Serial No. 35,902

15 Claims. (Cl. 200—87)

This invention relates to relays, and particularly to a relay for use in an automobile lighting circuit, and is designed to provide a relay which will operate efficiently with a minimum resistance or loss in the lighting circuit.

In my copending application Serial No. 692,110, filed October 4, 1933, which became Patent No. 2,012,917 on August 27, 1935, I have disclosed a spare lamp bulb carrier for use on automobiles, this carrier having lamp bulb holding sockets which are wired to be connected into the automobile lighting circuit through suitable controls or relays, the arrangement being such that when one of the running lamps of the vehicle burns out the corresponding replacement bulb in the carrier will be lighted, thereby apprising the driver of the fact that one of his running lights is burned out and further indicating which of the replacement bulbs to use to put in its place. Such a system as disclosed in said application provides for a relay in each running lamp circuit, this relay being connected in series with the lamp to which it is responsive. As long as the lamp is burning the field magnet of the relay is energized and the circuit to the replacement bulb is open. When the filament of the running light burns out the field magnet is de-energized, whereupon the relay armature shifts its position to close the circuit to the corresponding replacement bulb.

The headlights of an automobile are usually designed to operate over a voltage range between 6 and 8 volts with a maximum efficiency at 6.5 volts although some systems have a 12 volt potential. A relay in series with the lamp must be of such resistance that it will not appreciably diminish the brilliance of the running lamp. A voltage drop across the relay of as much as ½ of a volt makes a visible reduction in the illumination furnished by the running lamp.

According to the present invention there is provided a relay for use in this connection, the maximum voltage drop of which does not substantially exceed 1/10 of a volt. This voltage drop is not sufficient to produce apparent diminution of the brilliance of the running lamp bulb. At the same time the relay must be of such character that as long as the running lamp with which it is coupled is operating the armature will not be released, particularly with the vibration of the running of the vehicle or the roughness of the roads over which the vehicle is passing. The present invention provides a relay which, while producing a minimum voltage drop, has the necessary holding power to maintain the armature in proper position under all running conditions. A third factor which enters into the design of a relay for this purpose is that the relay, even if it is in running or spare light circuits for long periods of time, will not become heated. The present invention provides such a relay.

In addition to the electrical characteristics above described, the present invention provides a relay of such mechanical construction that it can be located inside the radiator shell, or inside the channel frame of the automobile, or other places where the wires to the running lights ordinarily go, it being necessary that the relay itself be in a direct line between the battery and the light so as to avoid excessive line losses by increasing the length of the wiring. In other words, if, for instance, the relay were of such construction that it had to be mounted in the dash or adjacent the spare bulb, many additional feet of wire would have to be included in each running light circuit, the resistance of which would produce an unfavorable voltage drop. The present invention provides a relay which is very small and compact and which may conveniently be in the form of a cartridge similar to the familiar cartridge fuse. It also provides a type of relay which being very small can be placed in the line without the necessity for drilled holes to provide additional support.

The invention may be readily understood by reference to the accompanying drawing which illustrates a preferred embodiment of my invention, and wherein—

Figure 1 represents a longitudinal section through an assembled relay embodying my invention, the drawing being to a scale approximately six times the actual size of the relay as it is manufactured;

Figure 2 is an exploded view showing the manner of assembling the various parts, the outer shell or casing being omitted;

Figure 3 is a more or less diagrammatic view showing one manner in which the relay can be clipped into one of the channel members of the vehicle frame; and Figure 4 is a circuit diagram showing the running light and spare bulb circuit, and the location of the relays in such circuit.

Referring first to Figure 4, A and B designate the headlights of an automobile or other vehicle, C is the stoplight and D is the tail light. The headlights A and B are shown as being provided with double filament bulbs and the two rear lights C and D are designated as being of the type having a single filament bulb. The battery is indicated at E. One side of the battery is grounded, while the other side leads to the main control switch F. The control switch F has two segments G and H, the segment G having two lead wires running therefrom to two corresponding filaments in the headlights A and B, these lead wires being designated generally as G'. The segment H has corresponding lead wires H' leading to the other filaments of the lamps A and B. The common terminal of the two filaments of the lamps A and B is grounded. One of the relays of the type to which the present invention pertains is located in each of the wires G' and H'. The switch F also has a third segment I which leads to one side of the tail lamp filament through wire I'. The stop light C is connected to one side of the battery by the wire J. The wires I' and J are also each provided with a relay of the type to which the present invention relates. These relays, in the diagram of Figure 4, are all designated K and the armatures thereof are designated K'. The spare bulb carrier, which is conveniently located at the dash of the motor vehicle, is designated L. It is provided with three replacement bulbs, one being designated M, one being designated N, and the third being designated O. The bulb M corresponds to the running lights A and B, the lamp N corresponds to the bulb used in the running light D, and the bulb O corresponds to the bulb used in the stop or running light C. The contacts of the several relays are so connected with the filaments of the replacement bulbs M and O through the circuits shown that when any relay is de-energized by the burning out of any filament, the corresponding filament in the lamps in the replacement bulb carrier is connected to the battery. As long, however, as the running lights are burning, the relay armatures hold the circuits to the replacement bulb filaments open.

It will be seen from the diagram of Figure 4 that the circuits from the central control switch F to the several lights are as direct as possible, particularly in the case of headlights, the wires going in one end of the relay and out the other so that the inclusion of the relay in each circuit does not increase the length of the lead lines. On the other hand, the lead lines or wires going to the replacement bulb filaments are relatively long.

The general circuit just described corresponds closely to the circuit shown in my said copending application, the present invention being concerned particularly with the relay.

Referring now to Figures 1 and 2, the relay designated generally by the numeral 2 comprises a central magnetizable core 3 mounted inside the hollow cylindrical magnetizable cup 4, the base portion 4' of this cup having a hole therethrough to tightly receive the reduced end of the core 3. Surrounding the magnetizable cup or shell 4—4' is a brass or other relatively non-magnetic shell or cup 5, this shell or cup being substantially longer than the shell 4. The shell 5 is provided with a base portion 5' through which the reduced end of the core 3 also passes. The forward end of the brass or similar shell 5 is provided with a cap 6 formed of insulating material. At the center of the cap 6 there is an eyelet type of contact 7, the outer end of which is riveted over a terminal member 8 to which the wire 9 leading to the replacement bulb can conveniently be attached. Surrounding the core 3 is a winding or field coil 10. This winding comprises a relatively few turns of wire of relatively large diameter, but varying in diameter with the resistance of its series lamp, the coils of wire being closely wrapped to the core 3 and being shielded in an insulating shell 11. The diameter of the coil is less than the diameter of the interior of the cup 4, leaving a space 12 between the outside of the coil and the inside of the magnetic shell or cup. One end of the core 3 is provided with a pole portion 3'. This pole portion is covered with a layer of a non-magnetic substance 3ª. This may be a coating of copper or it may be merely a thin layer of paper pasted over the end of the core. The armature of the relay comprises a disk-like member 13 having side flanges 14 which are turned in a direction parallel with the axis of the core and which are directed toward the open end of the magnetic shell or cup 4. The diameter of the members 4 and 14 is approximately the same. The armature 13 preferably has small holes 15 therethrough. It is formed of a magnetizable material, such as soft iron, and it carries at the center thereof the metallic button or contact 16. A spring 17 is provided in the space 12, one end of this spring bearing against the inside of the cup member 25 4—4' and the other end bearing against the inside of the armature member 13—14. The spring tends to urge the armature in a direction away from the pole 3' of the core 3 for the purpose of establishing contact between the central contact button 16 and the contact member 7.

The opposite end of the core 3, which is of reduced diameter and which passes through the bottoms 4' and 5' of the cups 4 and 5 respectively, also passes through one end of a connector member 18, through an insulating washer 18', through a copper connector 20, and through an insulating member 21; the outermost end of this reduced portion of the core being riveted over as shown. The coil or winding 10 has a lead wire at one end thereof which passes through registering openings in the bottoms of the cups 4 and 5 and which is connected to the connector 20. Wire 19 leading from the switch also attaches to the connector or terminal member 20. The connector or terminal member 20, while it is centered about the reduced portion of the iron core 3, is insulated from this core by reason of the fact that the bushing 21 has a portion which projects through the central hole 20' in the connector and prevents contact between the connector 20 and the end of the core. The other end of the coil is soldered or grounded directly on the core 3 as indicated at 22 in Figure 1.

The connector member 18 bears directly against the reduced portion of the core 3 and contacts with the bottom 5' of the brass shell 5. It is meant to lie along the outside of the brass shell, and the free end thereof 18ª is at the right hand end of the relay as shown in Figure 1. It provides a connection for the wire 23 leading to the running lamp, or to the battery. It is understood that either lead 20 or 18ª can be connected to either battery or lamp leads of the vehicle lighting circuit in order that spare light indicating lamp lead 8 will face more conveniently toward the dash or spare light carrier mounting position.

The entire relay structure just described is housed within a water-tight casing 24. This casing is shown as comprised of a metal shell 24ª having insulating disks 25 at the opposite ends thereof and having a lining of insulation 26 therein.

The manner of assembling the relay can be readily understood from Figure 2. The coil 10 is first wound upon the core 3. The core 3 is then inserted in the shell or cup 4. This cup is then inserted in the brass or substantially non-magnetic shell 5. Elements 18, 18', 20 and 21 are then assembled on the projecting reduced end of the core and this end is then riveted over to tightly clamp the parts together. The spring 17 is next inserted, after which the armature is put into place. The insulating bushing or cap 6 to which the contact member 7 and connector 8 have previously been riveted, is then forced into the open end of the shell 5. The various wires 9, 23 and 19 are then attached and the casing is put around the structure.

In Figure 1 the armature is shown in that position which it occupies when the coil 10 is energized. It will be noted that at this time the disk portion 13 of the armature is in direct contact with the non-magnetic layer 3ᵃ at the end of the core. The flange portion 14 of the armature almost but not quite contacts with the open end of the magnetic shell 4. The spring 17 is under slight compression. The advantage of this arrangement is that the magnetic field generated by the coil is all concentrated to hold the armature against the pole of the magnet. The field generated by the coil 10 not only induces magnetism in the core 3, but also induces magnetism in the magnetic shell 4 and the armature 13—14. The magnetic shell 4 with its base portion 4' provides a flux path for the magnetic field. The only break in the flux path is that minute gap which exists between the open end of the cup 4 and the free end of the flange 14 on the armature disk 13. By reason of this arrangement a maximum holding force with a field of minimum strength is secured. The brass shell 5 provides a guide in which the armature 13—14 is freely slidable, whereas if this shell were made of a magnetic material, such as iron, there would be an attraction between the side walls of the shell and the flange of the armature likely to impair or prevent the movement of the armature. The purpose of the cup shaped armature is to provide a type of piston having a wide bearing surface within the shell for insuring a free reciprocating motion to the armature and thereby preventing a tendency for the armature to lodge by tilting or cocking at an angle against the contact 7 on cap 6 when the running lights are burning brightly. A further purpose of the cup-like armature is, as previously explained, to concentrate the magnetic flux and utilize to full advantage the strength of the relatively weak electromagnet to attract and hold the armature. It is further understood that running lights mean all outside lights of the vehicle. The purpose of the non-magnetic layer 3ᵃ is, of course, to cause the armature to instantly release upon the de-energization of the coil 10 and not be held by any residual magnetism in the core. The purpose of having the wire 19 enter at one end of the casing and the wire 23 leave from the opposite end of the casing, is merely to enable the relay to be installed directly in the lead wire of an existing car through the removal of a corresponding length of the original wire and the insertion of the present relay.

The arrangement provides that the spring 17 is a relatively long spring, i. e., extending the whole length of the magnet core, and a spring of relatively large diameter. The wire of which the spring is composed, however, is of relatively small gauge but large enough in cross sectional area to carry, without undue heating, the current necessary to light the spare bulb indicator for long periods of time. The advantage of this arrangement is that while, upon de-energization of the relay, the coil will force the armature to the right as viewed in Figure 1, it is a spring which is easily compressed when the armature moves, under the influence of the relatively weak magnetic field, in the opposite direction. In other words, a spring having a larger number of convolutions compresses more readily but exerts the same force as a stiffer spring of fewer convolutions.

The operation of the relay may easily be followed. Current entering from the wire 23 passes into the shells 4 and 5, and into the core 3. From the core 3 it enters the coil 10 at the point 22. From the opposite end of the coil 10 it passes to the connector 20 and thence to the wire 19 leading to the vehicle running lamp. As long as current flows in this manner, the armature of the relay is attracted to the core. When the circuit is broken, however, the current entering the relay through the wire 23 and the connector 18 flows along the spring 17 to the armature 13—14. Contact 16 at this time bears against contact 7 and the current leaves the contact 7, enters the wire 9, and energizes the replacement bulb. Obviously, if shell 5 is made of metal, current also could flow through shell 5 to armature 13—14, thence through contacts 16 and 17. This provides a dual path assuring contact for the proper operation of the replacement bulb.

A relay as thus constructed effectively operates with a voltage drop not exceeding one-tenth of a volt and it thus provides in the lighting system a relay which will not apparently diminish the effective brilliance of the lamp and enables the lamp to operate at approximately its maximum efficiency. The convenience of mounting the relay is indicated in Figure 3 where the relay 2 is shown as being supported on a channel member X forming part of the vehicle frame by means of a simple spring clip Y. It thus lies parallel in the general direction in which the wires extend.

While the armature has only a very slight longitudinal movement, it does, nevertheless, act as a plunger or piston inside the shell 5. The purpose of the holes 15 is to lighten the weight of the armature and to allow for the free flow of air from one side of the armature to the other so as to avoid any plunger or compressing result.

While I have illustrated and described one particular embodiment of the principle of my invention, it will be understood that various changes and modifications may be made within the contemplation of my invention and under the scope of the following claims.

I claim:

1. A relay having a fixed magnetizable core, a fixed magnetizable base member on which the core is carried, a winding about the core, an armature at the end of the core opposite the base member formed of magnetizable material, a spring outside the winding tending to separate the armature and base member the armature and the base member substantially enclosing the core and winding, and a contact arranged for co-operation with the armature when the relay is de-energized.

2. A relay having a magnetizable core, a magnetizable base member on which the core is fixed, a winding about the core, an armature at the end of the core opposite the base member formed of magnetizable material, the armature and the base member substantially enclosing the core and winding, and a spring outside the winding and enclosed by the base member and armature for actuating the armature in a direction opposite the direction of magnetic pull, an enclosure, and cooperating contact points on the armature and the enclosure, and which are closed when the relay is de-energized, the armature being freely movable in one direction under the influence of the spring and being freely movable in the opposite direction under magnetic influence.

3. A relay having a magnetizable core, a magnetizable base member on which the core is carried and on which it is fixed, a winding about the core, a movable armature at the end of the core opposite the base member formed of magnetizable material, the armature and the base member substantially enclosing the core and winding, and a substantially non-magnetic shell in which the armature is slidably supported, said shell having a cap of insulating material at the armature end thereof which cap carries a contact point, the armature having a corresponding contact point for engagement therewith when the relay is de-energized.

4. A relay comprising a magnetizable core, a magnetizable base member on which the core is mounted in fixed relation and in the form of a substantially cylindrical cup, a winding on the core, a cup-like armature at the end of the core opposite the base member, said armature also being of magnetizable material, the armature and the base member being turned in opposing directions and substantially enclosing the winding and core, the armature having a contact point thereon, a cooperating contact supported at the armature end of the relay externally of the armature for engagement with the contact on the armature when the relay is de-energized, and a spring outside the winding on the core tending to separate the contacts.

5. A relay comprising a magnetizable core, a magnetizable base member on which the core is mounted in fixed relation and in the form of a substantially cylindrical cup, a winding on the core, a cup-like armature at the end of the core opposite the base member, said armature also being of magnetizable material, the armature and the base member being turned in opposing directions and substantially enclosing the winding and core, a spring coextensive with the core inside the base member and armature and outside the winding, the armature having a contact point thereon, and a cooperating contact supported at the armature end of the relay externally of the armature for engagement with the contact on the armature when the relay is de-energized.

6. A relay comprising a magnetizable core, a magnetizable base member on which the core is mounted and in the form of a substantially cylindrical cup, a winding on the core, a cup-like armature at the end of the core opposite the base member, said armature also being of magnetizable material, the armature and the base member being turned in opposing directions and substantially enclosing the winding and core, a spring co-extensive with the core inside the base member and armature and outside the winding, and a substantially non-magnetic shell enclosing the base member and armature and projecting beyond the end of the armature, and an insulating member at the armature end of said shell and a contact element for cooperation with the armature secured on said insulating member.

7. A relay comprising a magnetizable core, a magnetizable base member on which the core is mounted and in the form of a substantially cylindrical cup, a winding on the core, a cup-like armature at the end of the core opposite the base member, said armature also being of magnetizable material, the armature and the base member being turned in opposing directions and substantially enclosing the winding and core, a spring coextensive with the core inside the base member and armature and outside the winding, the base member and armature being of such length that when the armature is attracted against the end of the core a gap of only a small fraction of an inch exists between the open end of the base and the open end of the armature, the armature having a contact point thereon, and a cooperating contact supported at the end of the armature externally thereof for engagement with the contact on the armature when the relay is de-energized.

8. A relay comprising a magnetizable core, a magnetizable base member on which the core is mounted and in the form of a substantially cylindrical cup, a winding on the core, a cup-like armature at the end of the core opposite the base member, said armature also being of magnetic material, the armature and the base member being turned in opposing directions and substantially enclosing the winding and core, a spring coextensive with the core inside the base member and armature and outside the winding, the base member and the armature being of such length that when the armature is attracted against the end of the core a gap of only a small fraction of an inch exists between the open end of the base and the open end of the armature, a guiding sleeve of non-magnetic material enclosing the base member and the armature and in which the armature has a sliding fit, said sleeve preventing the armature from rocking or tipping, a contact-carrying disc at the armature end of the sleeve for making electrical contact with the armature when the relay is de-energized.

9. A relay comprising opposed cup-like members one of which is movable relatively to the other and both of which are formed of magnetizable material, a magnetizable core carried by one of said members, a winding about said core, a spring about the winding tending to urge the said cup-like members apart, the movable member having a contact thereon and a fixed contact into engagement with which the contact on the movable member comes when the members are separated by the spring.

10. A relay comprising opposed cup-like members one of which is movable relatively to the other and both of which are formed of magnetizable material, a magnetizable core carried by one of said members, a winding about said core, a spring about the winding tending to urge the said cup-like members apart, a shell in which the movable one of said two members is guided, the movable member having a contact thereon and a fixed contact on the shell arranged to be engaged by the contact on the movable member when such members are separated by the spring.

11. A relay comprising a magnetizable core, a cup-like magnetizable base member on which the core is fixed, a cup-like non-magnetic shell member in which the base member is housed and which provides a guide for the armature, a cup-like armature opposed to the base member and guided in said non-magnetic shell, said core having an extension passing through said base member and said shell and having the outer end thereof riveted over to secure the parts together, there being a coil about the core, the armature having a contact thereon, the shell having a cooperating contact, the contacts engaging when the relay is de-energized.

12. A relay comprising a relatively long cylindrical shell of smaller diameter contained within a cartridge-like casing having two lead wires entering one end thereof and one wire leading from the other end thereof, said relay including a core and a cylindrical cup-like base member and a cup-like armature, the relay being adapted for connection in a line with the axis of the relay corresponding to the general direction in which the line runs, whereby said relay can be inserted in the line merely by the removal of a corresponding length of wire from the line, the relay being provided with cooperating contacts which are engaged only when the relay is de-energized.

13. A relay for use in automobile lighting circuits wherein lamps are designed for operation at approximately 6.5 volts, said relay comprising magnetic armature and base members, a core substantially enclosed by said armature and base members and having a winding thereon, said armature and base members also housing a coiled spring surrounding the winding, the winding for said relay being such that the voltage drop produced by said relay in the lighting circuit does not substantially exceed one-tenth of one volt, the relay being provided with circuit-closing contacts which engage when the relay is de-energized.

14. A relay having a core, an enclosing shell of magnetizable material on which the core is fixed, a field winding about the core and within the shell, an armature forming in effect a continuation of the shell and serving to concentrate the magnetic flux between the shell and the core whereby a small field strength effects movement of the armature toward the core, a contact on the armature, and a cooperating contact supported adjacent the armature and engaged thereby when the relay is de-energized and a spring surrounding the field winding.

15. A relay for use in automobile lighting circuits wherein lamps are designed for operation at a voltage between about 12 volts and about 6.5 volts, said relay comprising magnetizable armature and base members, a core substantially enclosed by said armature and base members and having a winding thereon, said armature and base members also housing a coiled spring surrounding the winding, the winding for said relay being such that the voltage drop produced by said relay in the lighting circuit does not substantially exceed one-tenth of one volt, and a contact supported adjacent the armature to be engaged thereby when the relay is de-energized.

FRANK D. ROHMER.